United States Patent [19]

Langford et al.

[11] Patent Number: 5,004,058

[45] Date of Patent: Apr. 2, 1991

[54] WEIGH SCALE USING MULTIPLE DIGITAL LOAD CELLS

[75] Inventors: Stephen R. Langford, Joplin; James R. Stone; William C. Bagley, both of Webb City, all of Mo.

[73] Assignee: Cardinal Scale Manufacturing Company, Webb City, Mo.

[21] Appl. No.: 500,024

[22] Filed: Mar. 27, 1990

[51] Int. Cl.$^5$ .................. G01G 3/14; G01L 25/00; G01L 1/22

[52] U.S. Cl. .................. 177/25.13; 177/211; 73/1 B; 73/862.67

[58] Field of Search .............. 177/211; 73/1 B, 862.67

[56] References Cited

U.S. PATENT DOCUMENTS

| | | | |
|---|---|---|---|
| 4,261,195 | 4/1981 | Lockery | 177/211 X |
| 4,294,322 | 10/1981 | Nishiyama | 177/211 X |
| 4,380,175 | 4/1983 | Griffen | 177/211 X |
| 4,492,280 | 1/1985 | Susor | 177/211 |
| 4,556,115 | 12/1985 | Lockery et al. | 177/211 |
| 4,696,359 | 9/1987 | Glibbery | 177/211 |
| 4,799,558 | 1/1989 | Griffen | 177/211 X |
| 4,804,052 | 2/1989 | Griffen | 177/25.14 |

OTHER PUBLICATIONS

P-Controlled Measurement Sharpen Industrial Processes; Electronic Design, Dec. 10, 1981.
Linear Applications Handbook; National Semiconductor Corporation 1984 Linear Supplement Databook; National Semiconductor Corporation
Digitally Compensated Pressure Sensors for Flight Measurement; Douglas B. Juanarena and Chris Gross; Pressure Systems Inc.

Primary Examiner—George H. Miller, Jr.
Attorney, Agent, or Firm—Hovey, Williams, Timmons & Collins

[57] ABSTRACT

A multiple load-cell weigh scale (10) is disclosed which provides for substantially enhanced accuracy and significantly greater convenience in compensating for load position. The preferred scale (10) includes a platform (12) supported by plurality of digital load cells (14), a central controller (16) for producting a plurality of digital excitation signals representative of a selected excitation voltage for the respective load cells, and an excitation control unit (22) for each load cell for receiving respective excitation signals and for controlling excitation voltage of an associated load cell (20) in accordance therewith.

15 Claims, 5 Drawing Sheets

WEIGH SCALE USING MULTIPLE DIGITAL LOAD CELLS

BACKGROUND OF THE INVENTION

1. Field of the Invention

The present invention relates to a weigh scale using multiple, digital, load cells for providing substantially enhanced accuracy and significantly greater convenience in compensating for load position. More particularly, the present invention relates to a weigh scale in which the excitation of each load cell is digitally controlled, preferably from a central controller.

2. Description of the Prior Art

In a platform scale using multiple load cells, the weight of the object being weighed is determined as the total of the individual load cell outputs which are typically summed electronically. This weight total indication can vary, however, in accordance with the position of the object on the platform. This is due to cell mounting inaccuracies, mounting non-repeatability errors, cell calibration inaccuracies, and cell response to off-axis forces.

In order to compensate for this phenomenon, prior art load cells have been equipped with a potentiometer for varying the excitation voltage of the individual load cells. Procedurely, a weight is repetitively placed on the platform over each load cell and each associated potentiometer adjusted in turn until compensation is achieved. This procedure requires many repetitions and is particularly inconvenient and time consuming because the installer must adjust each potentiometer usually from location within the scale pit.

SUMMARY OF THE INVENTION

The prior problems outlined above are solved by the weigh scale and load cell assembly of the present invention. That is to say, the weigh scale hereof allows the installer to vary electronically the excitation of each load cell from a central controller without the need for adjusting each load cell from location within the scale pit.

The preferred weigh scale broadly includes a load-receiving platform supported by plurality of load cells, a central control unit for producing a plurality of digital excitation signals corresponding to and representative of selected excitation voltages for the respective load cells, and an excitation control unit coupled with each load cell and with the central control unit for receiving the respective digital excitation signals and responsive thereto for controlling the excitation voltage of the associated load cell.

In preferred forms, the excitation control unit includes a microprocessor associated with each load cell. In one embodiment, a plurality of resistors is coupled in parallel between one of the load cell excitation terminals and respective input/output (I/O) ports of the microprocessor. The microprocessor selectively activates and deactivates the I/O ports in accordance with the digital excitation signals in order to selectively connect and disconnect the resistors to vary the excitation voltage of the load cell.

In another embodiment, the digital excitation signal is provided to a digital-to-analog (DAC) convertor which produces a corresponding analog output to the base of a transistor coupled with the load cell excitation terminal to control the excitation voltage.

Other preferred aspects of the present invention are disclosed hereinbelow.

DETAILED DESCRIPTION OF THE PREFERRED EMBODIMENTS

Figure 1:
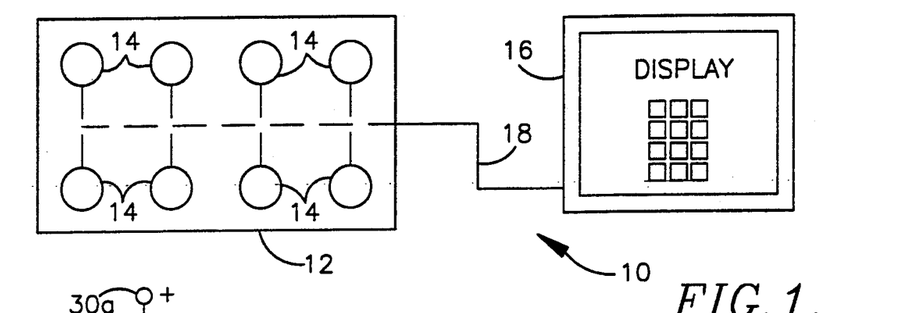
FIG. 1 is a schematic representation of the preferred weigh scale having a plurality of load cell assemblies and a central controller.

FIG. 1 is a schematic illustration of preferred weigh scale 10 which broadly includes platform 12 for receiving a load to be weighed, a plurality of load cell assemblies 14 (eight assemblies 14 are illustrated in FIG. 1.) in supportive relationship with platform 12, central controller 16 for producing a plurality of digital excitation signals corresponding to and representative of selected excitation voltages for the respective load cell assemblies 14, and serial data bus 18 interconnecting load cell assemblies 14 with central controller 16.

Figure 2:
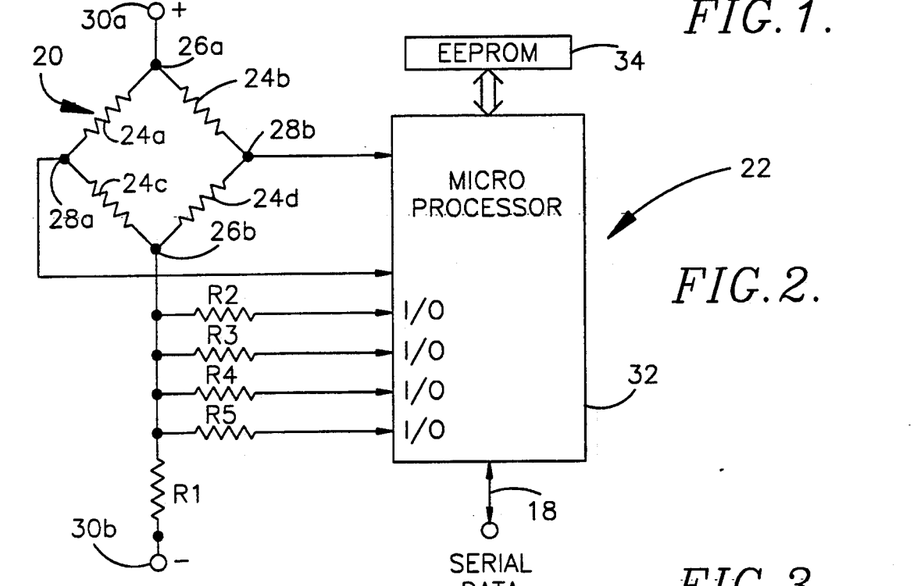
FIG. 2 is an electrical schematic representation of one preferred load cell assembly of FIG. 1.

FIG. 2 illustrates the first preferred embodiment of each load cell assembly 14 and broadly includes load cell 20 and excitation control unit 22.

Each load cell 20 is conventional in nature and includes four strain gages 24a, 24b, 24c, and 24d, excitation terminals 26a and 26b, and output terminals 28a and 28b. Excitation terminals 26a,b receive excitation voltage from a conventional source thereof (not shown) by way of respective positive and negative excitation input terminals 30a and 30b.

Excitation control unit 22 includes microprocessor 32 (Z8 type) having an electrically erasable, programmable read-only-memory (EEPROM) (type 93C46) 34 coupled therewith. Resistor R1 interconnects excitation terminal 26b and input terminal 30b. Excitation control unit 22 also includes excitation control resistors R2, R3, R4, and R5 coupled as shown in FIG. 2. One side of each control resistor is connected to excitation terminal 26b with the other side connected to respective open-drain input/output (I/O) ports included as part of microprocessor 32. The I/O ports common terminal is connected to negative excitation input terminal 30b.

The value selected for resistors R1-R5 depend upon a number of factors including the resistance of the strain gage bridge and the desired excitation adjustment range. In the preferred embodiment described herein and with the bridge at 350 ohms, the preferred values of resistors R1-R5 are nominally 10, 53.0, 26.5, 13.25, and 6.63 ohms respectively but can be changed to fit a particular installation as a matter of design choice. These values provide an adjustment range between about 97.22% and 99.26% of the applied excitation voltage over sixteen steps.

Load cell output terminals 28a,b are also connected to appropriate terminals of microprocessor 32 (by way of an internal A/D convertor) which receives data from and transmits data to central controller 16 by way of serial data bus 18.

As explained further hereinbelow in connection with the operating program of microprocessor 32, the excitation of load cell 20 is controlled by selectively activating and deactivating the I/O ports connected to resistors R2–R5. This in turn selectively couples and decouples resistors R2–R5 in order to selectively sink current thereby controlling the excitation of load cell 20. With four I/O ports, sixteen excitation increments are possible. As those skilled in the art will appreciate, the number of I/O ports can be increased or decreased significantly as desired to increase or decrease the resolution of the excitation voltage control. For example, if five I/O ports and five resistors were provided, the excitation could be controlled in thirty-two increments over the expected operating range.

Microprocessor 32 receives the analog output from load cell 20 by way of load cell analog output terminals 28a,b. By means of an internal analog-to-digital convertor (not shown) or external convertor, if desired, microprocessor 32 processes these output signals in a conventional manner for providing a digital data representative thereof for transmission to the central controller 16 by way of data bus 18 which is preferably a serial daisy-chain bus or, less preferred, such as disclosed in U.S. Pat. No. 4,804,052 which patent is hereby incorporated by reference as part of the disclosure hereof. Advantageously, microprocessor 32 also processes load cell data to compensate for temperature, creep, and linearity of the individual load cell. Microprocessor 32 then transmits this compensated data to central controller 16 for summation with data from other load cell assemblies and for further processing and display.

Figure 3:
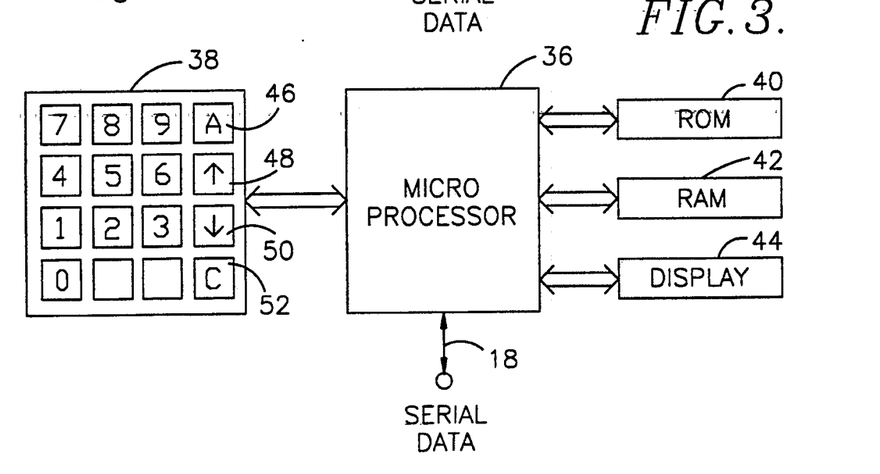
FIG. 3 is an electrical schematic representation of the preferred central controller.

FIG. 3 illustrates central controller 16 which includes the conventional components of central microprocessor 36 which is connected for data reception and transmission with keypad 38, read-only-memory (ROM) 40, random-access-memory (RAM) 42, display 44, and serial data bus 18. Other types of I/O ports may also be included depending upon the various other functions desired.

Keypad 38 includes twenty-four conventional membrane switches and, in addition to switches numerically labeled 0–9, includes control switch 46, excitation increase switch 48, excitation decreases switch 50, and control switch 52.

Figures 4, 6C:
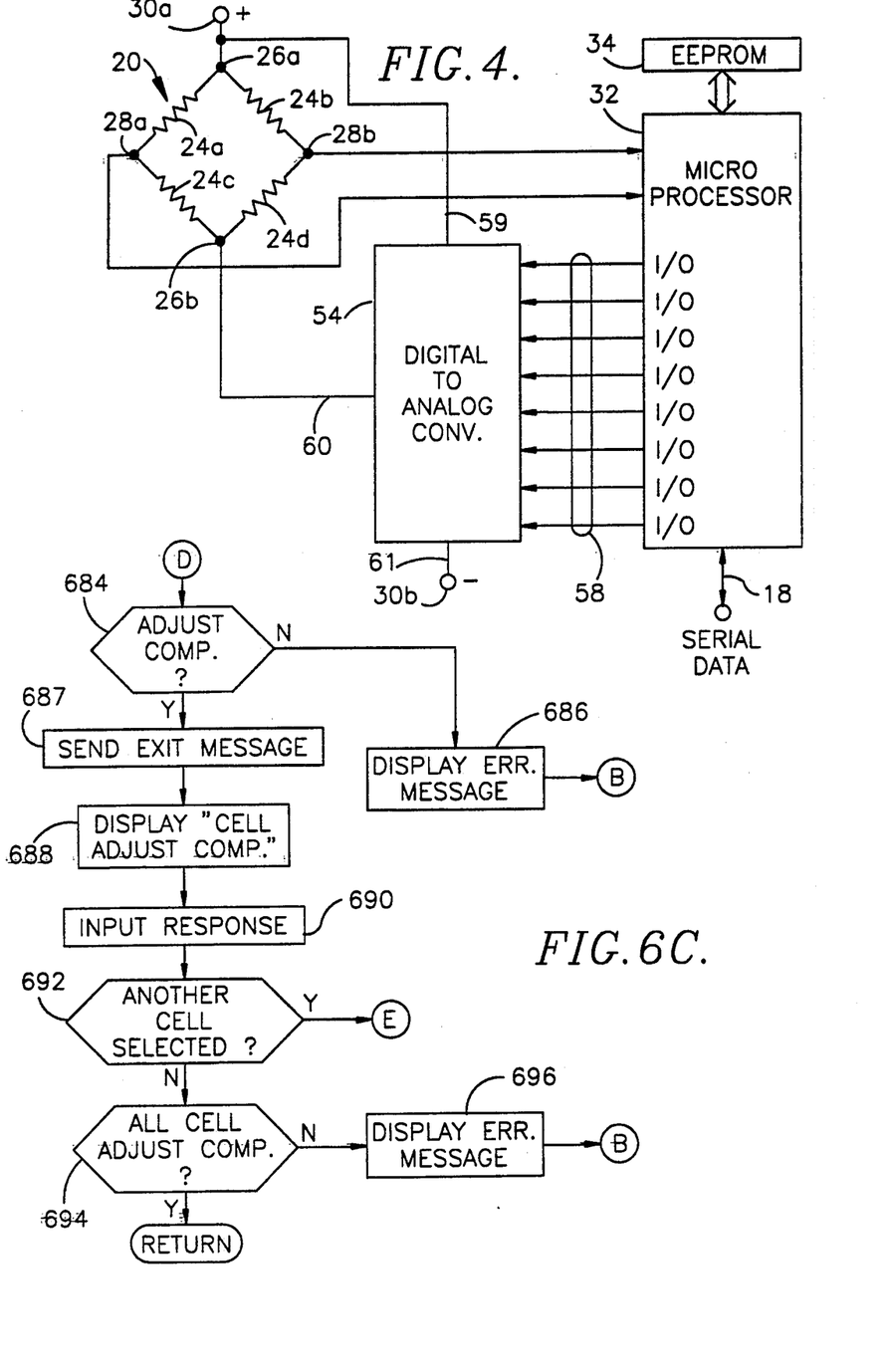
FIG. 4 is an electrical schematic representation of a second embodiment of the preferred load cell assembly.
FIG. 6C is the last portion of the computer program flow chart for operating the central controller.

FIG. 4 illustrates the second preferred embodiment of each load cell assembly 14. The second embodiment includes components in common with the embodiment illustrated in FIG. 2 and these components are numerically labeled the same. The second embodiment of load cell 14 also includes conventional digital-to-analog convertor (DAC) 54 which is an eight-bit convertor connected by way of lines 58 with corresponding I/O ports of microprocessor 32 and as shown in FIG. 4 to terminals 30a, 26b, and 30b. In operation, DAC 54 receives eight bits of digital data by way of bus 58 from microprocessor 32 and converts this data into an analog excitation output to load cell 20. The analog voltage from DAC 54 controls the excitation, that is, the voltage drop, of load cell 20.

Figure 5:
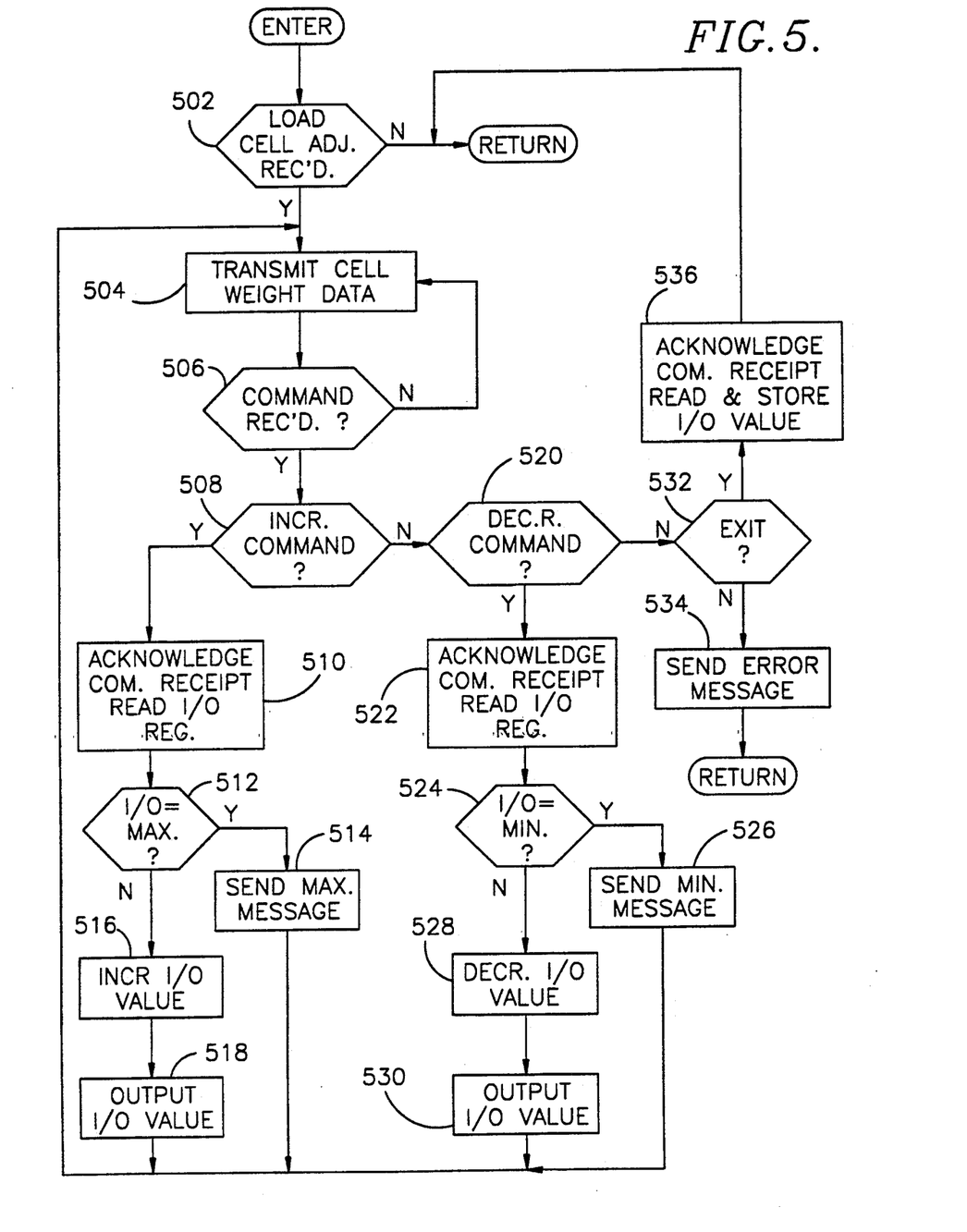
FIG. 5 is a computer program flow chart illustrating the operation of the microprocessor included in each load cell assembly.

FIG. 5 is a computer program flow chart for operating microprocessor 32 of load cell assemblies 14. The program is preferably written in assembly language and is advantageously included as part of other program modules for processing the weight data received from load cell 20 in order to convert the data into digital format for transmission over data bus 18, and to compensate for temperature, non-linearity, creep, and so forth as is conventionally known. The program illustrated in FIG. 5 enters at step 502 which asks whether a command for load cell excitation adjustment has been received from central control unit 16 by way of data bus 18. If no, the program returns to the main loop If the answer to 502 is yes, the program moves to step 504 in which microprocessor 32 transmits its current load cell weight data to central control unit 16.

The program then moves to step 506 which asks whether a command has been received. If no, program loops back to step 504.

If yes, the program moves to step 508 which asks whether the command received is an increase command. If yes, the program moves to step 510 which acknowledges receipt of the command and reads the internal I/O register controlling the I/O ports. The program then moves to step 512 which asks whether the I/O register is already at maximum and cannot be increased further. If yes, the program moves to step 514 which sends a message to control unit 16 that the load cell excitation is already at maximum. The program then loops back to step 504.

If the answer to step 512 is no, the program moves to step 516 which increments the value of the I/O register by one unit. The program then moves to step 518 which outputs the I/O register value to the I/O ports in order to increase the excitation voltage on load cell 20 by one increment. Program then loops back to step 504.

If the answer in step 508 is no, indicating that the command received was not an increase command, the program moves to step 520 which asks whether the command is a decrease command. If yes, the program moves to step 522 which acknowledges receipt of the command and reads the current value stored in the I/O register. The program then moves to step 524 which asks whether the I/O register value is at its minimum level. If yes, the program moves to step 526 which sends a message to central unit 16 that the register is already at its minimum allowable level. Preferably, the minimum allowable level is greater than zero which allows the excitation increments to span the range between the maximum and the minimum thereby improving the resolution and precision of the excitation control. After step 526, the program loops back to step 504.

If the answer to 524 is no, the program moves to step 528 which decrements the I/O register value by one unit. The program then moves to step 530 to output the register value to the I/O ports and thereby decrease the excitation of load cell 20.

In step 520, if the receive command is not a decrease command, and step 508 having already indicated that the command is not an increase command, the program moves to step 532 which asks whether the command is for "exit". If no, which is the only other command allowable, the program moves to step 534 to send an error message to a control unit 16 indicating that an erroneous command has been received. The program then returns to the main loop.

If the answer to step 532 is yes, the program moves to step 536 which acknowledges receipt of the exit command and then reads and stores the current I/O register value in EEPROM 34. This step ensures that in the event of power loss, the excitation data is available when power is restored. The program then returns to the main loop.

Figure 6A:
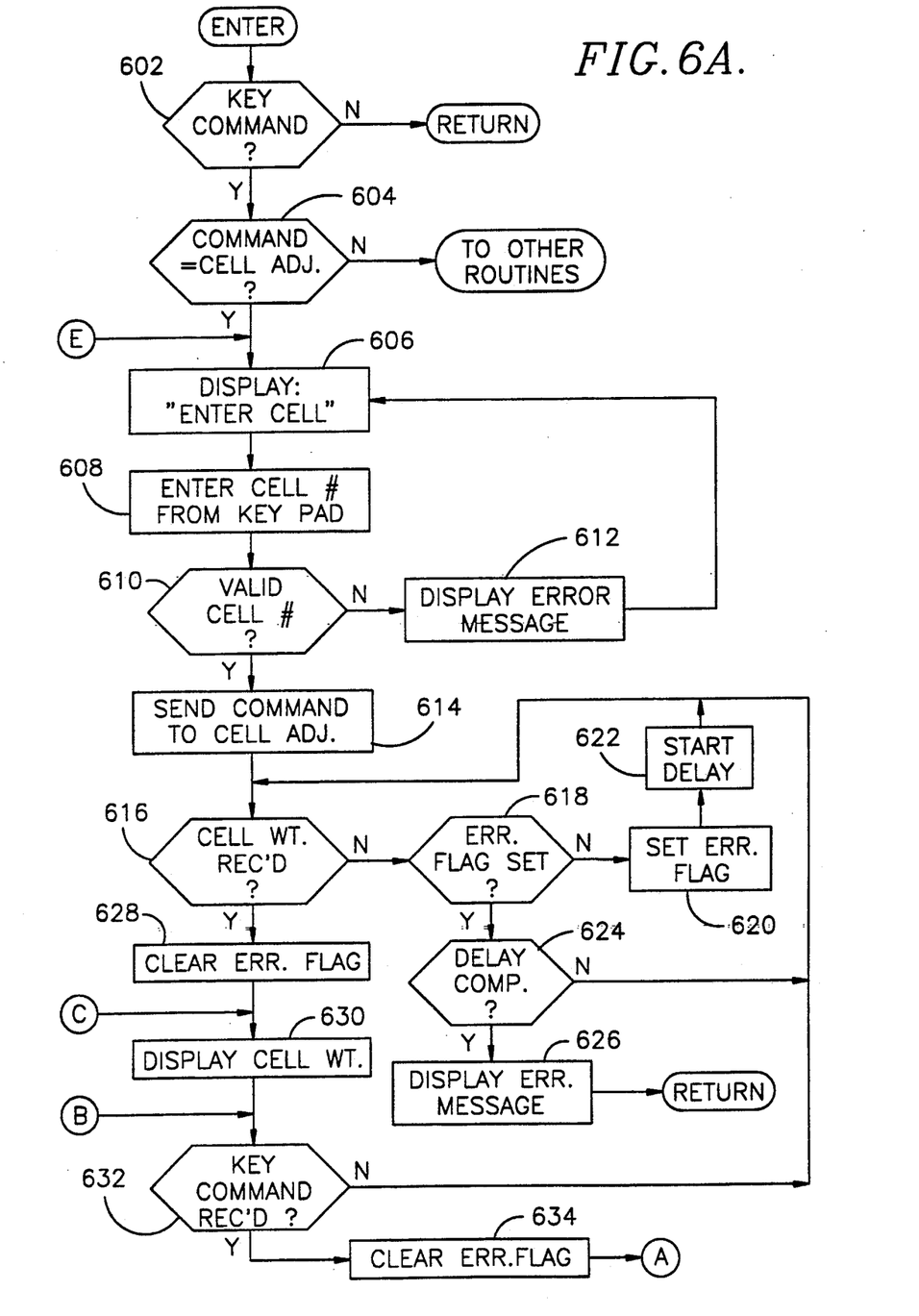
FIG. 6A is a first portion of a computer program flow chart for operating the central controller.
Figure 6B:
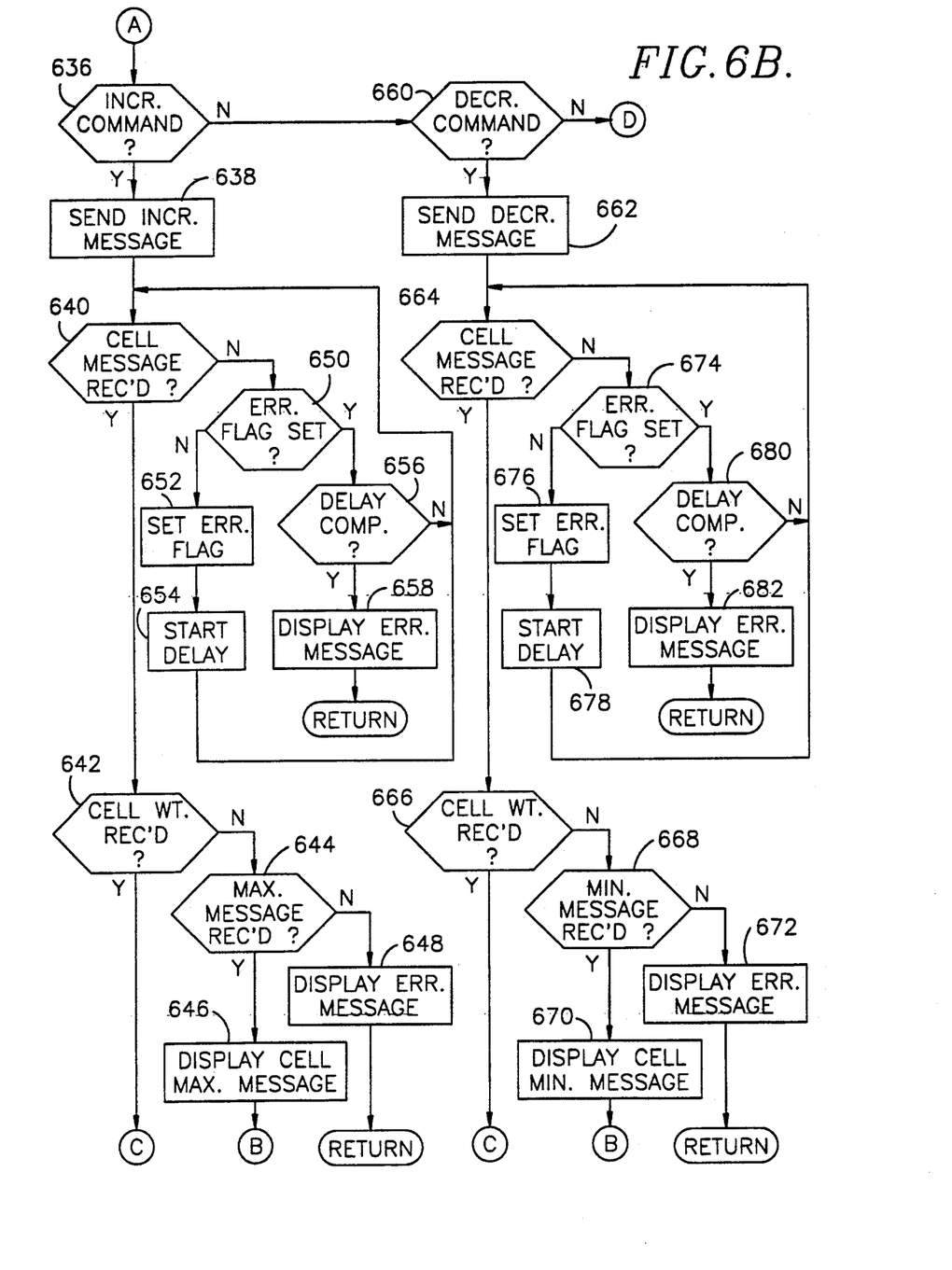
FIG. 6B is a second portion of the computer program flow chart for operating the central controller.

FIGS. 6A-C illustrate the operating program for microprocessor 36 included in central control unit 16. This program is preferably part of a main program including other conventional modules for processing data from load cell assemblies 14.

The program enters at step 602 which asks whether a key command has been received from one of the membrane switches of keypad 38. If no, the program returns to the main loop. If yes, the program moves to step 604 which asks if the received command is a command to adjust the excitation voltage of an individual load cell. This is indicated by activation of membrane switch 46 labeled "A". If no, indicating that some other command has been received, the program moves to the appropriate modules associated with that command.

If the answer to step 604 is yes, the program moves to step 606 which displays the notation "enter cell number" on display 44. This instructs the installer to enter the appropriate identification number of the load cell assembly to be adjusted. The installer enters the appropriate load cell assembly number in step 608 and the program moves to step 610 which asks whether a proper load cell number has been received. For example, in order to prevent unauthorized adjustment, the cell assemblies may be coded with a serial number known only to authorized personnel. The cell number entered is checked against data stored in memory and if the cell number does not match with an assigned serial number, the program moves to step 612 to display an error message. The program then loops back to step 606 to request again entry of a load cell serial number.

If the answer to step 610 is yes, the program moves to step 614 which sends commands by way of data bus 18 to actuate the appropriate load cell assembly. The program then moves to step 616 which asks whether cell weight data has been received which is in response to step 504 (FIG. 5) and functions as a conventional "hand-shake" indicating that communication has been established with the appropriate load cell assembly.

If the answer to step 616 is no, the program moves to step 618 which asks whether a programming error flag has already been set. If no, the program moves to step 620 which sets the error flag and then to step 622 to start a time delay to allow for the addressed load cell assembly to respond with its cell weight data. The program then loops back to step 616. If the load cell weight data has still not been received, the program again moves to step 618. This time, however, the error flag is set and the program moves to step 624 which asks whether the delay time is complete which was set in step 622. If no, the program continues to loop through steps 616, 618 and 624 until the delay is complete or until the cell weight is received.

If the cell weight is not received by the time the delay is complete in step 624, the answer is yes, and the program moves to step 626 to display the error message that the load cell has not responded. The program then exits to the main loop.

In normal operation the cell weight is received, the answer in step 616 is yes, and the program moves to step 628 to clear the error flag set in step 620. The program then moves to step 630 to display the cell weight.

The program then moves to step 632 which asks whether an increase or decrease key command has been received through activation of either respective switches 48 or 50. If such a key command has not been received, the program loops back to step 616. If the answer of step 632 yes, the program moves to step 634 to clear the error flag.

Referring now to FIG. 6B, after step 634 the program moves to step 636 which asks whether the key command received in 632 is a command to increase the excitation voltage. If yes, the program moves to step 638 which sends a command over data bus 18 to the addressed load cell instructing it to increment the excitation voltage. The program then moves to step 640 which asks whether a responsive message has been received from the addressed load cell which functions as a "hand-shake". Such a message might be received in response to steps 510, 522, or 536 (FIG. 5).

If the answer in step 640 is yes, the program moves to step 642 which asks whether the message received is a cell weight. If yes, the program loops back to step 630. If the answer in step 642 is no, the program moves to step 644 which asks whether the message received indicates that the maximum excitation voltage is already being imposed in response to step 514. If yes, the program moves to step 646 to display the appropriate message on display 44. If the answer in step 644 is no, the program moves to step 648 to display an error message indicating that the proper response has not been received from the addressed load cell. The program then returns to the main loop.

Back in step 640, if a cell message has not been received, the program moves to step 650 which asks whether an error flag has been set. If no, the program moves to step 652 to set the error flag and then to step 654 to begin a time delay. The program then loops back to 640.

If a cell message has still not been received, the error flag is set, the answer in step 650 is yes, and the program moves to step 656 to ask whether the delay time is complete as indicated in step 654. If no, the program loops back to step 640. If yes, the program moves to step 658 to display an error message indicating that a cell message has not been received within the allowed time. The program then returns to the main loop.

If the answer in step 636 is no, indicating that the command received from keypad 38 is not an increase command, the program moves to step 660, which asks if the received command is a decrease command. If yes, the program executes steps 662-682 which are steps analogous to 638—658 but for decreasing the excitation voltage instead.

If the answer in step 660 is no, indicating that neither an increase non decrease command has been received, the program moves to step 684 in FIG. 6C. This step asks whether the command message received indicates that the adjustments have been complete This is indicated by the installer activating membrane switch 52 labeled "C".

If the answer to step 684 is no, then none of the allowable commands has been received and the program moves to step 686 to display an error message indicating such and then loops back to step 632 (FIG. 6A) to wait for input of a proper command.

If the answer in step 684 is yes indicating that the cell adjustments have been completed, the program moves to step 687 which sends an "exit" message to the addressed load cell. The program then moves to step 688 to display the message "cell adjustment complete". The program then moves to step 690 to receive another input response from keypad 38 and then moves to step 692 which asks whether the command to adjust another load cell assembly has been selected. If yes, the program loops back to step 606 (FIG. 6) to begin the adjustment process for the next selected load cell.

If the answer in step 692 is no, the program moves to step 694 which asks whether the adjustment of all the load cells is complete which occurs upon the second activation of membrane switch 52. If the answer to step 694 is no, which indicates an error condition, the program moves to step 696 to display an error message and then loops back to step 632 (FIG. 6) to wait for the entry for a proper command from keypad 38. If the answer in step 694 is yes, indicating that all the load cells have been adjusted, the program returns to the main loop.

With the structure and operation of weigh scale 10 in mind, it can be appreciated that the present invention allows an installer to adjust the excitation of the inconvenient load cells without the need for physical manipulation of potentiometers or the like from a location within the scale pit. Additionally, the digital control of the excitation voltage provides greater setting stability than has been practical in the prior art.

As those skilled in the art will appreciate, the present invention encompasses many variations in the preferred embodiments described herein. For example, while it is preferred that each load cell include a dedicated excitation control unit, a central excitation control unit could be used to provide the respective outputs to the load cells for excitation thereof. Furthermore, while the use of microprocessors is preferred for economy and ease of program revisions, it will be appreciated that the functions illustrated by the computer program could also be embodied in hardware by use of a custom-designed semi-conductor chip, for example.

Having thus described the preferred embodiments of the present invention, the following is claimed as new and desired to be secured by Letters Patent:

We claim:

1. A weigh scale comprising:
   load receiving means for receiving a load to be weighed;
   a plurality of load cells for placement in supportive relationship with said receiving means,
   each of said load cells including means for receiving an excitation voltage from a source thereof and means for producing a load cell output in accordance with the load weight supported;
   digital signal means for producing a plurality of digital excitation signals corresponding to and representative of selected excitation voltages for said respective load cells; and
   excitation control means coupled with said load cells and with said digital signal means for receiving said digital signals and responsive thereto for controlling the respective excitation voltages of said load cells in accordance with the corresponding digital signal.

2. The weigh scale as set forth in claim 1, said digital signal means including a microprocessor.

3. The weigh scale as set forth in claim 1, said digital signal means including means for selectively changing said digital excitation signals for selectively changing the respective excitation voltages imposed on said load cells.

4. The weigh scale as set forth in claim 3, said the changing means including first and second, manually actuatable switches for respectively and selectively increasing and decreasing the respective excitation voltage.

5. The weigh scale as set forth in claim 1, further including the signal handling means for receiving said load cell outputs from said load cells and for producing digital outputs representative of said respective load cell outputs.

6. The weigh scale as set forth in claim 1, said excitation control means including a digital-to-analog convertor.

7. The weigh scale as set forth in claim 1, each of said load cells presenting a pair of excitation terminals, said excitation control means including
   a plurality of microprocessors respectively associated with said load cells and respectively having a plurality of output ports selectively activable and deactivable in response to a corresponding digital excitation signal, and
   a plurality of parallel-connected resistors for each of said load cells coupled between one of said excitation terminals and respective ones of said ports,
   each of said microprocessors including means for selectively activating and deactivating said ports in response to a corresponding digital excitation signal for selectively coupling and decoupling said resistors with said excitation terminal in order to control the excitation of the associated load cell.

8. The weigh scale as set forth in claim 1, each of said load cells presenting a pair of excitation terminals, said excitation control means including
   a plurality of digital-to-analog converters respectively associated with each of said load cells, each of said convertors including means for receiving associated digital excitation signals and responsive thereto for producing an analog excitation signal correlated therewith, and
   a plurality of transistor means respectively coupled with one of said excitation terminals of a respective load cell and with a respective one of said associated convertors, each of said transistor means including means for receiving the respective analog excitation signal from said associated convertor and for controlling the excitation of the associated load cell in accordance therewith.

9. The weigh scale as set forth in claim 8, said excitation terminal including a positive terminal and negative terminal, said one of said terminal including said negative terminal.

10. The weigh scale as set forth in claim 8, the other said terminals including means for coupling with a source of excitation voltage, said transistor means including means for controlling the voltage drop across the the respective load cell between the said excitation terminals.

11. A digital load cell assembly comprising:
   a load cell including means for receiving an excitation voltage from a source thereof and means for producing a load cell output representative of the load imposed on said load cell;
   signal handling means coupled with said load cell for receiving said load cell output and, in response thereto, for producing any corresponding digital output; and
   excitation control means coupled with said load cell for receiving a digital excitation voltage from a source thereof representative of a selected excitation voltage for said load cell, and in response, for controlling the excitation voltage of said load cell in accordance with said excitation signal.

12. The load cell assembly as set forth in claim 11, said load cell presenting a pair of excitation, terminals, said excitation control means including
a digital-to-analog converter for receiving said digital excitation signal and in response for producing an analog excitation signal correlated therewith, and
transistor means coupled with one of said excitation terminals and with said digital-to-analog converter for receiving said analog excitation signal and in response for controlling the excitation of said load cell in accordance therewith.

13. The load cell assembly as set forth in claim 12, said excitation terminals including a positive terminal and a negative terminal, said one of said terminals including said negative terminal.

14. The load cell assembly as set forth in claim 12, the other said terminals including means for coupling with a source of excitation voltage, said transistor means including means for controlling the voltage drop across said load cell between said terminals.

15. The load cell assembly as set forth in claim 11, said load cell presenting a pair of excitation terminals, said excitation control means including
a microprocessor having a plurality output ports selectively activatable and deactivatable in response to said digital excitation signal, and
a plurality of parallel connected resistors coupled between one of said excitation terminals and respective ones of said ports,
said microprocessor including means for selectively activating and deactivating said ports in response to said excitation signal for selectively coupling and decoupling said resistors from said one excitation terminal in order to control the excitation voltage of said load cell.

* * * * *